（12）United States Patent
Slezak

(10) Patent No.: US 8,825,543 B2
(45) Date of Patent: *Sep. 2, 2014

(54) SYSTEM AND METHOD FOR MULTI-MARKET RISK CONTROL IN A DISTRIBUTED ELECTRONIC TRADING ENVIRONMENT

(71) Applicant: Trading Technologies International, Inc., Chicago, IL (US)

(72) Inventor: Robert J. Slezak, Wilmette, IL (US)

(73) Assignee: Trading Technologies International Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/048,748

(22) Filed: Oct. 8, 2013

(65) Prior Publication Data

US 2014/0040108 A1    Feb. 6, 2014

Related U.S. Application Data

(63) Continuation of application No. 11/241,169, filed on Sep. 30, 2005, now Pat. No. 8,583,534.

(51) Int. Cl.
*G06Q 40/00* (2012.01)

(52) U.S. Cl.
USPC .................... 705/37; 705/38; 705/39; 705/35

(58) Field of Classification Search
CPC ........ G06Q 40/00; G06Q 40/06; G06Q 40/04
USPC .................................................... 705/35–40
See application file for complete search history.

(56) References Cited

U.S. PATENT DOCUMENTS

| | | |
|---|---|---|
| 4,694,397 A | 9/1987 | Grant et al. |
| 4,985,833 A | 1/1991 | Oncken |
| 5,911,135 A | 6/1999 | Atkins |
| 5,937,396 A * | 8/1999 | Konya .............................. 705/43 |
| 6,038,549 A | 3/2000 | Davis et al. |
| 6,112,191 A * | 8/2000 | Burke .............................. 705/41 |
| 6,788,771 B2 | 9/2004 | Manto |
| 6,950,867 B1 | 9/2005 | Strohwig et al. |
| 7,020,632 B1 | 3/2006 | Kohls et al. |
| 7,096,197 B2 | 8/2006 | Messmer et al. |
| 7,236,947 B2 | 6/2007 | Eckert et al. |
| 7,340,430 B2 | 3/2008 | Mulinder et al. |
| 7,356,497 B1 | 4/2008 | Bursey et al. |
| 7,356,498 B2 | 4/2008 | Kaminsky et al. |

(Continued)

FOREIGN PATENT DOCUMENTS

WO    2005059794 A1    6/2005

*Primary Examiner* — Edward Baird
(74) *Attorney, Agent, or Firm* — McDonnell Boehnen Hulbert & Berghoff LLP

(57) ABSTRACT

A system and method are provided for distributed risk management. According to one example embodiment, a central risk controller is provided that can communicate with a plurality of local risk management modules located at a plurality of gateways. The central risk controller may allocate a portion of a central account balance associated with a trading account to each local risk management module. Then, as the trades are made using the trading account, the local risk management modules may manage risk associated with the trades until the local account balance is insufficient. As the account balance gets low, the local risk management module may query the central risk controller for the additional risk account balance.

19 Claims, 8 Drawing Sheets

(56) References Cited

U.S. PATENT DOCUMENTS

| | | |
|---|---|---|
| 7,398,242 B2 | 7/2008 | Laederich et al. |
| 7,665,657 B2 | 2/2010 | Huh |
| 7,753,261 B2 | 7/2010 | Rosenblatt et al. |
| 7,797,207 B1 | 9/2010 | Dilip et al. |
| 7,870,071 B2 | 1/2011 | Gupta |
| 8,086,530 B2 * | 12/2011 | Resnick et al. ............... 705/39 |
| 2002/0073018 A1 | 6/2002 | Mulinder et al. |
| 2002/0082967 A1 | 6/2002 | Kaminsky et al. |
| 2002/0099641 A1 * | 7/2002 | Mills et al. .................... 705/37 |
| 2002/0133455 A1 * | 9/2002 | Howorka et al. ............. 705/37 |
| 2002/0152156 A1 * | 10/2002 | Tyson-Quah .................. 705/38 |
| 2002/0198823 A1 | 12/2002 | Laederich et al. |
| 2003/0050879 A1 | 3/2003 | Rosen et al. |
| 2003/0069759 A1 | 4/2003 | Smith |
| 2003/0076940 A1 | 4/2003 | Manto |
| 2003/0200165 A1 | 10/2003 | Nielsen et al. |
| 2003/0236748 A1 | 12/2003 | Gressel et al. |
| 2004/0002913 A1 | 1/2004 | Breen et al. |
| 2004/0236668 A1 * | 11/2004 | Toffey ........................... 705/37 |
| 2004/0260640 A1 * | 12/2004 | Crosthwaite et al. ......... 705/37 |
| 2005/0086141 A1 * | 4/2005 | Lewis ............................ 705/35 |
| 2005/0273407 A1 | 12/2005 | Black et al. |
| 2006/0064372 A1 | 3/2006 | Gupta |
| 2006/0106707 A1 | 5/2006 | Shetty et al. |
| 2006/0293983 A1 | 12/2006 | Rosenblatt et al. |
| 2009/0271325 A1 | 10/2009 | Wilson |

* cited by examiner

SYSTEM AND METHOD FOR MULTI-MARKET RISK CONTROL IN A DISTRIBUTED ELECTRONIC TRADING ENVIRONMENT

CROSS REFERENCE TO RELATED APPLICATIONS

The present application is a continuation of U.S. patent application Ser. No. 11/241,169 filed Sep. 30, 2005, now U.S. Pat. No. 8,583,534, and entitled "SYSTEM AND METHOD FOR MULTI-MARKET RISK CONTROL IN A DISTRIBUTED ELECTRONIC TRADING ENVIRONMENT," the contents of which are fully incorporated herein by reference.

TECHNICAL FIELD

The present invention is directed to electronic trading. More specifically, the present invention is directed towards a system and method for risk management in an electronic trading environment.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions.

Electronic trading is generally based on a host exchange, one or more computer networks, and client devices. In general, the host exchange includes one or more centralized computers to form the electronic heart. Its operations typically include maintaining an exchange order book that records unexecuted orders, order matching, providing price and order fill information, and managing and updating a database that records such information. The host exchange is also equipped with an external interface that maintains uninterrupted contact to the client devices and possibly other trading-related systems.

Using client devices, traders link to the host exchange through one or more networks to trade tradeable objects. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

A client device is a computer such as a personal computer, laptop computer, hand-held computer, and so forth that has network access. A network is a group of two or more computers or devices linked together in any fashion, which can be characterized by topology, protocol, and architecture. For example, some market participants may link to the host through a direct network connection such as a T1 or ISDN. Some participants may link to the host exchange through direct network connections and through other common network components such as high-speed servers, routers, and gateways that allow a trader to connect to an electronic exchange. The Internet, a well-known collection of networks and gateways, can be used to establish a connection between the client device and the host exchange. There are many different types of wired and wireless networks and combinations of network types known in the art that can link traders to the host exchange.

Sometimes, on their machines, traders use automated or semi-automated trading tools, collectively hereinafter referred to as automated tools, that automatically or semi-automatically send orders for tradeable objects to the exchange. Many different trading tools are usually provided to, among other things, facilitate fast and accurate order entry. For instance, an automated tool might quickly calculate one or more order parameters, such as order price or order quantity, based on market conditions, or some other reference condition, and then automatically send an order with these parameters to an exchange for matching. According to many existing and popular exchanges today, the speed with which an order gets from a trading station to an exchange is crucial, since orders are electronically entered in an exchange order book in the sequence in which they are received at the exchange (a first-in, first-out, commonly referred to as FIFO matching system). Based on this sequence, and the availability of market quantity, orders are filled, with priority given to the first order entered, then the second (next) order entered, and so forth. It should be understood that different matching algorithms, such as, for example, pro rata algorithms, could be used as well.

Many existing trading environments use risk management systems to ensure that a trader does not enter into trades that could potentially result in exceeding a trader's credit limit, or yet some other preset risk parameters, such as a maximum net position that a trader is willing to hold at any given time, for example. While some traders are sole proprietors who risk their own money while trading, others often trade for larger trading groups, such as trading houses. Larger trading groups often use a centralized risk management component that controls and manages global risk as well as risk related to each individual trader. Using such a system, every time a gateway receives an order request from one of the traders in the trading house, the gateway has to communicate with a centralized risk management component to determine if the proposed trade would not take the trader over the risk limits preconfigured for the trader who initiated the order or/and risk limits defined for the trading house. Once the gateway receives a response allowing the proposed trade to be sent to an exchange, the trade may be forwarded to the exchange.

While such risk control systems provide an effective risk control mechanism, they also slow down trading. In the centralized risk control system, when the centralized risk management component receives requests from many gateways, the component puts the requests in its internal queue and processes them in the order they were received, thus, creating unnecessary delays at the gateways that have to wait for a response from the central component. The order delay problems grow exponentially as the trading house uses automated trading tools that may generate hundreds of orders per second, thus, creating a bottleneck of requests at the centralized risk management that consequently slows down the speed with which the orders get to the exchanges. Thus, it is desirable to offer tools that will not only provide the benefits of the centralized risk control systems, but will also solve order latency problems.

BRIEF DESCRIPTION OF THE DRAWINGS

Example embodiments are described herein with reference to the following drawings, in which.

DETAILED DESCRIPTION

I. Overview

Example systems and associated methods described below provide means for risk control in a distributed electronic trading environment. According to one example method, a central risk management may establish communication with a local risk management. Upon establishing the communication, the local risk management module may receive from the central risk management module a portion of a central risk account balance to create a local risk management balance for a trading account. When the local risk management module receives an order request from a trading entity using the trading account, the local risk management module may determine if there is a sufficient balance available in the local account balance to forward the order request to a computerized matching process. If the balance is sufficient, the local risk management may forward the order request to the computerized matching process without any need to communicate with the central risk management module. The central risk management module may replenish the local account balance either automatically or upon receiving a request from the local risk management module. Additional embodiments related to risk management according to the example embodiments will be described below.

While the example embodiments are described herein with reference to illustrative embodiments for particular applications, it should be understood that the example embodiments are not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. A First Example Trading System

Figure 1:
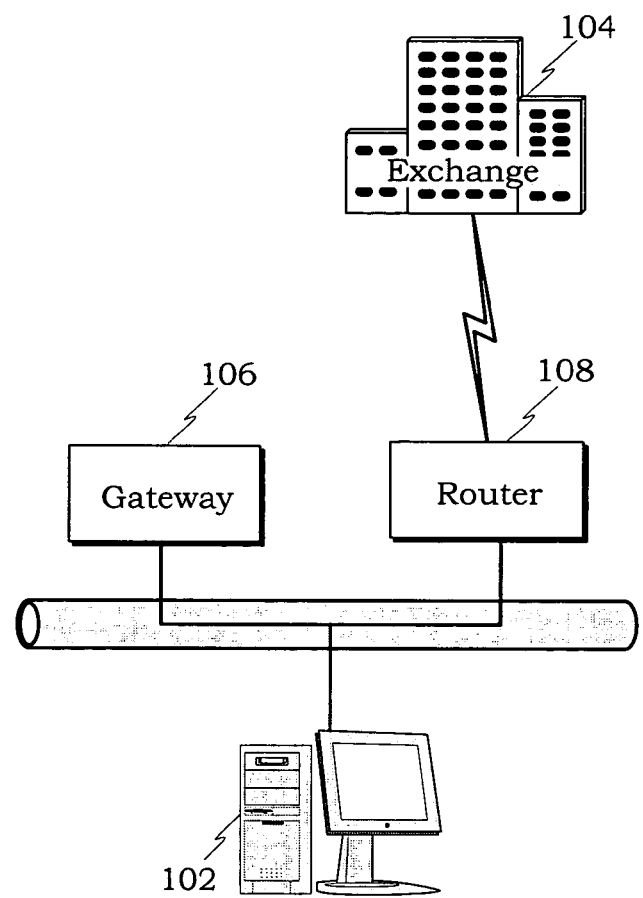
FIG. 1 illustrates a trading system for electronic trading according to an example embodiment, wherein the trading system includes a trading station where a trader can submit bids and offers for a tradeable object being traded at an electronic exchange.

FIG. 1 illustrates an example electronic trading system in which the example embodiments may be employed. In this example, the system comprises a trading station 102 that accesses an electronic exchange 104 through a gateway 106. Router 108 is used to route messages between the gateway 106 and the electronic exchange 104. The electronic exchange 104 includes a computer process (e.g., the central computer) that matches buy and sell orders sent from the trading station 102 with orders from other trading stations (not shown). The electronic exchange 104 may list one or more tradeable objects for trade. While not shown in the figure for the sake of clarity, the trading system may include other devices that are specific to the client site like middleware and security measures like firewalls, hubs, security managers, and so on, as understood by a person skilled in the art.

The computer employed as the trading station 102 generally can range from a hand-held device, laptop, or personal computer to a larger computer such as a workstation and multiprocessor. An illustrative personal computer uses Pentium™ microprocessors and operates under a Windows 2000™, Windows NT™, or Windows XP™ operating system. Generally, the trading station 102 includes a monitor (or any other output device) and an input device, such as a keyboard and/or a two or three-button mouse to support click based trading, if so desired. One skilled in the art of computer systems will understand that the present example embodiments are not limited to any particular class or model of computer employed for the trading station 102 and will be able to select an appropriate system.

The computer employed as the gateway 106 generally can range from a personal computer to a larger computer. An illustrative gateway 106 computer uses Pentium™ microprocessors and operates under a Windows 2000™ or Windows NT™ (server or workstation) operating system. Generally, the gateway 106 may additionally include a monitor (or any other output device), input device, and access to a database, if so desired. One skilled in the art of computer systems will also understand that the present example embodiments are not limited to any particular class or model of computer(s) employed for the gateway 106 and will be able to select an appropriate system.

It should be noted that a computer system that may be employed here as a trading station or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

It should also be noted that the trading station 102 generally executes application programs resident at the trading station 102 under the control of the operating system of the trading station 102. Also, the gateway 106 executes application programs resident at the gateway 106 under the control of the operating system of the gateway 106. In other embodiments and as understood by a person skilled in the art, the function of the application programs at the trading station 102 may be performed by the gateway 106, and likewise, the function of the application programs at the gateway 106 may be performed by the trading station 102.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system; these illustrations are meant to be helpful to the reader, and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a T1, T3, ISDN, or some other high speed connection.

In another example illustration, the client site may be located on the actual grounds of the electronic exchange (for example, in the building of the exchange). According to this instance, the trading station, the gateway, and the router may still communicate over a local area network, but the router may communicate with the matching process at the electronic exchange through another connection means besides a T1, T3, or ISDN.

In yet another example illustration, the gateway may be housed at, or near, its corresponding electronic exchange. According to this instance, the trading station may communicate with the gateway over a wide area network or through the use of a T1, T3, ISDN, or some other high speed connection.

In another example illustration, the gateway may be located remote from the trading station and remote from the electronic exchange, which might be particularly useful in systems that include interconnection of multiple trading networks. Thus, one trading network might have gateway access to an electronic exchange. Then, other trading networks may communicate with the trading network that has gateway access through a T1, T3, ISDN, or some other high speed connection.

III. A Second Example Trading System

Figure 2:
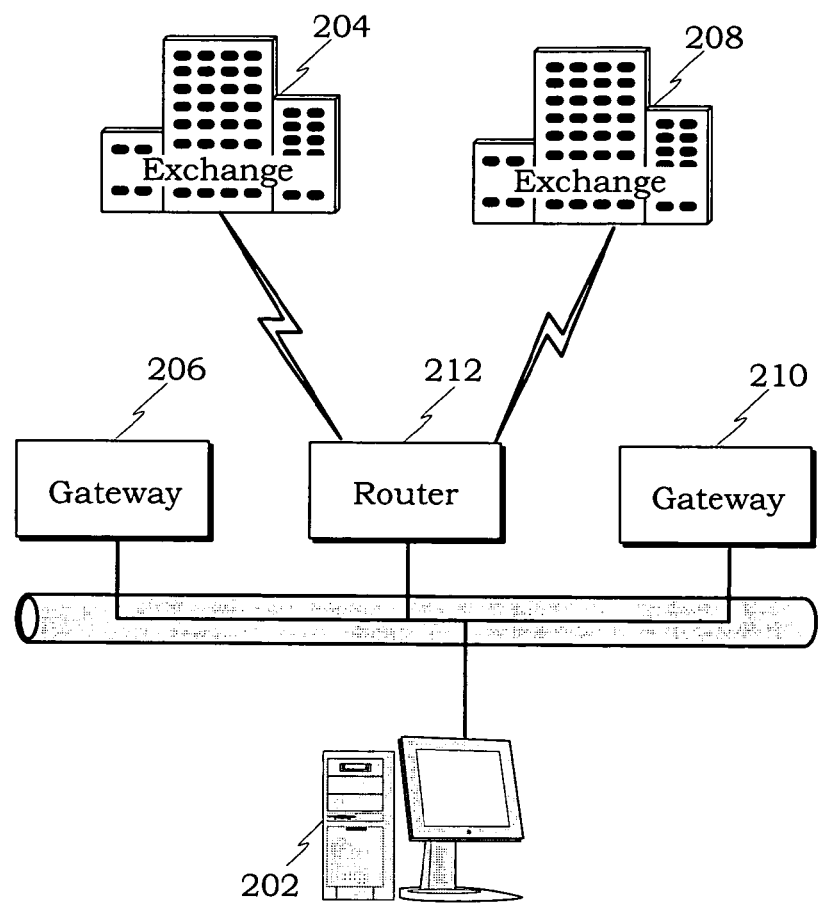
FIG. 2 illustrates another trading system for electronic trading according to another example embodiment, wherein the trading system includes a trading station where a trader can submit bids and offers for a tradeable object being traded at more than one electronic exchange.

FIG. 2 illustrates another example trading system that uses similar computer elements as shown in FIG. 1, in which, the example embodiments may be employed to trade at multiple electronic exchanges. The system comprises a trading station 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired.

The trading system presented in FIG. 2 provides the trader with the opportunity to trade tradeable objects listed at different electronic exchanges. To some traders, there can be many advantages with a multi-exchange environment. For example, a trader could view market information from each tradeable object through one common visual display. As such, price and quantity information from the two separate exchanges may be presented together so that the trader can view both markets simultaneously in the same window. In another example, a trader can spread trade different tradeable objects listed at the different electronic exchanges.

As indicated earlier, one skilled in the art of electronic trading systems will understand that the present embodiments are not limited to the particular configurations illustrated and described with respect to FIG. 1 and FIG. 2, and will be able to design a particular system based on the specific requirements (for example, by adding additional exchanges, gateways, trading stations, routers, or other computers serving various functions like message handling and security). Additionally, several networks, like either of the networks shown in FIG. 1 or FIG. 2, may be linked together to communicatively access one or more electronic exchanges.

IV. An Example Risk Control System

The example system described below distributes centralized risk management data so that trading is generally not delayed by communication with a centralized risk component, while still providing centralized risk control and management. According to one example embodiment that will be described in greater detail below, a centralized risk component allocates a fraction of the central risk account balance to a local risk component that can be located at a gateway. The localized risk component may then manage a local risk balance without communicating with the central risk component until the local account balance is high enough to allow submission of trades corresponding to the received order requests. Then, as the local account balance gets low, the local risk component may communicate with the central risk component to obtain an additional account balance. This example method as well as additional functional aspects of the example system will be described in greater detail below.

Figure 3:
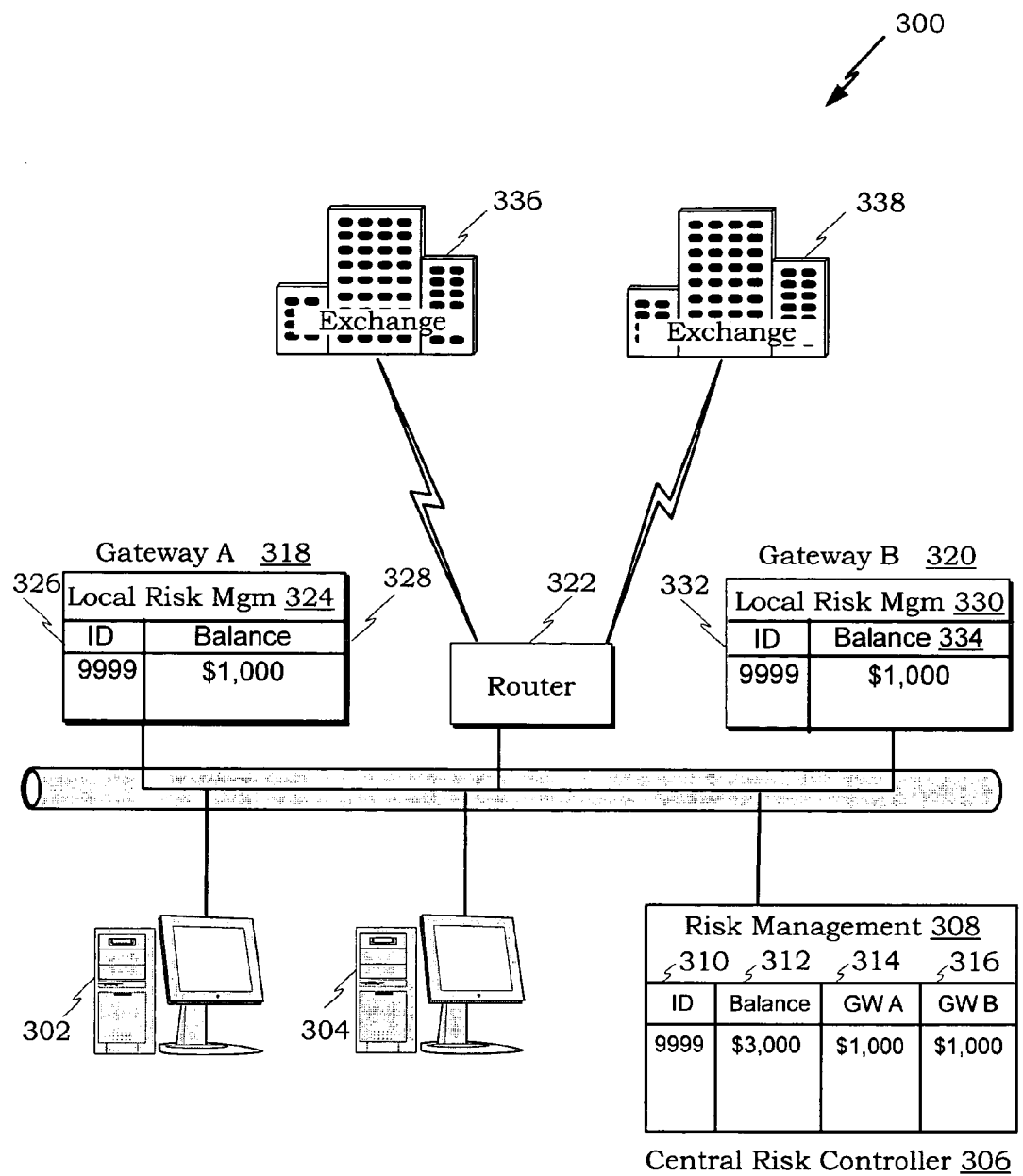
FIG. 3 illustrates an example distributed risk management system, in which the example embodiments for distributed risk management may be employed.

FIG. 3 illustrates an example distributed risk management system 300, in which, the example embodiments for distributed risk management may be employed. The system 300 includes trading stations 302 and 304 that can access multiple electronic exchanges 336 and 338. In this particular example, the exchange 336 can be accessed through a gateway "A" 318, and the exchange 338 can be accessed through a gateway "B" 320. Alternatively, each gateway can provide access to both exchanges. A router 322 is used to route messages between the gateways 318 and 320 and the electronic exchanges 336 and 338. The system 300 also includes risk management components. More specifically, a central risk controller 306 includes a risk management module 308 that is used to control, allocate, and manage risk related parameters corresponding to the trading stations 302 and 304. The risk parameters can include, but are not limited to a current available credit, an available margin to place a trade, and/or trading related risk data, such as an overall net position, a filled net long position, a filled net short position, an open net position, the current profit/loss level ("P/L"), working outright orders, or the combination thereof. Those skilled in the art will understand that many additional risk-related parameters could be used as well. In general, it should be understood that any equation including one or more parameters that control trading could be used as well for managing risk allocated to each trading stations 302 and 304.

In addition to the central risk controller 306, each gateway 318 and 320 is associated with a local risk management component 324 and 330 that locally manage risk corresponding to orders received at each respective gateways, the details of which will be described in greater detail below. FIG. 3 illustrates the components 324 and 330 being internal with respect to each gateway. However, it should be understood that, in an alternative embodiment, each gateway could communicate with a standalone localized risk management components as well.

According to one example embodiment, it will be assumed that the trading stations 302 and 304 use a single trading account for conducting trades at the electronic exchanges 336 and 338 through the gateways 318 and 320. However, each trading station could have its own trading account or multiple trading accounts. The trading account includes one or more risk related parameters described above that are used for risk management. For the purpose of this example, let's assume that a risk related parameter that is used in relation to the trading account is a monetary account balance available for trading to the trading stations 302 and 304, such as, for example, $5,000.

According to one example embodiment, the central risk controller 306 may allocate a portion of the total account balance corresponding to the trading account to each local risk management component 324 and 330. The local risk management components 324 and 330 may then locally manage risk data based on the provided risk account balance. According to the example using $5,000 as the total available account balance, the risk management module 308 could allocate the balance of $1,000 to each local risk management component 324 and 330. In such an embodiment, the local risk management components 324 and 330 could locally manage the risk as one or more orders are being sent through each gateway up to the limit of its allocated funds, such as $1,000 in this example. As the local account balance gets low, the local risk management components 324 and 330 can communicate with the centralized risk controller 306 to obtain additional funds. It should be understood that different account amounts could be allocated to each gateway based on any preset rules. Methods of communications between the centralized risk controller 306 and localized risk management modules 324 and 330 to allocate and manage local accounts at each local risk management component will be described in greater detail below in relation to the subsequent figures.

According to one example embodiment, each risk management component creates and dynamically updates risk data records corresponding to one or more trading accounts or traders. FIG. 3 illustrates one such configuration in relation to each risk management component. For example, each record created at the risk management component 308 may include an account identifier field, an account balance field, and local allocation records, such as, gateway balance allocation records, "GW A" and "GW B" allocation records, in this example. FIG. 3 illustrates one example record created at the risk management component 308 for a trading account being used by the trading stations 302 and 304. The account record includes an account identifier of "9999" shown at 310 corresponding to the trading stations 302 and 304, an account balance of $3,000 as shown at 312, and the fund balance that was allocated to each gateway, $1,000 in this example, as shown at 314 and 316. It should be understood that each balance related entry can be updated based on how the funds are allocated between the localized risk management modules. Also, it should be understood that additional data could be stored in each record, and the illustrated record is only an example. For example, additional entries could be created when more than two gateways are used by a trading station to send orders to one or more exchange. Also, while the example record show risk parameter in the format of the available trading funds, different risk related parameters discussed above could be used at the central risk controller 306 in addition to or instead the available trading funds.

Similarly to the centralized records being kept at the risk management module 308, gateways 318 and 320 may create and update its own account records once risk data corresponding to a specific account is allocated to each of them, therefore eliminating the need to communicate with the central risk controller 306 to manage risk associated with each trade order to be sent to an electronic exchange through the gateways. One example set of records is illustrated in relation to the local risk management modules 324 and 330, with each record using a client "ID" field and "Balance" field, with specific entries shown at 326, 328, 332, and 334. As mentioned in relation to the example provided earlier, $1,000 was allocated to each local risk management module 324 and 334 for local risk management of trades made from the trading stations 302 and 304 using the account labeled "9999," in this specific example.

It should be understood that the system 300 shown in relation to FIG. 3 is only an example, and different changes in the system configuration could be made to accomplish the same functionality. For example, rather than keeping risk management records at each gateway, each gateway could communicate with a standalone database that could store the records. Also, a single local risk management module could be used for more than two gateways that are placed at the same location.

Different methods related to the functional aspects of the distributed risk management system will be described in relation to the subsequent flowcharts. It should be understood that each block in the flowcharts may represent a module, segment, or portion of code, which includes one or more executable instructions stored on one or more computer readable media for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the present invention. Also, the flowcharts will be described in relation to the components illustrated in FIG. 3. However, it should be understood that more, fewer, or different components could also be used to execute the methods described below.

Figure 4:
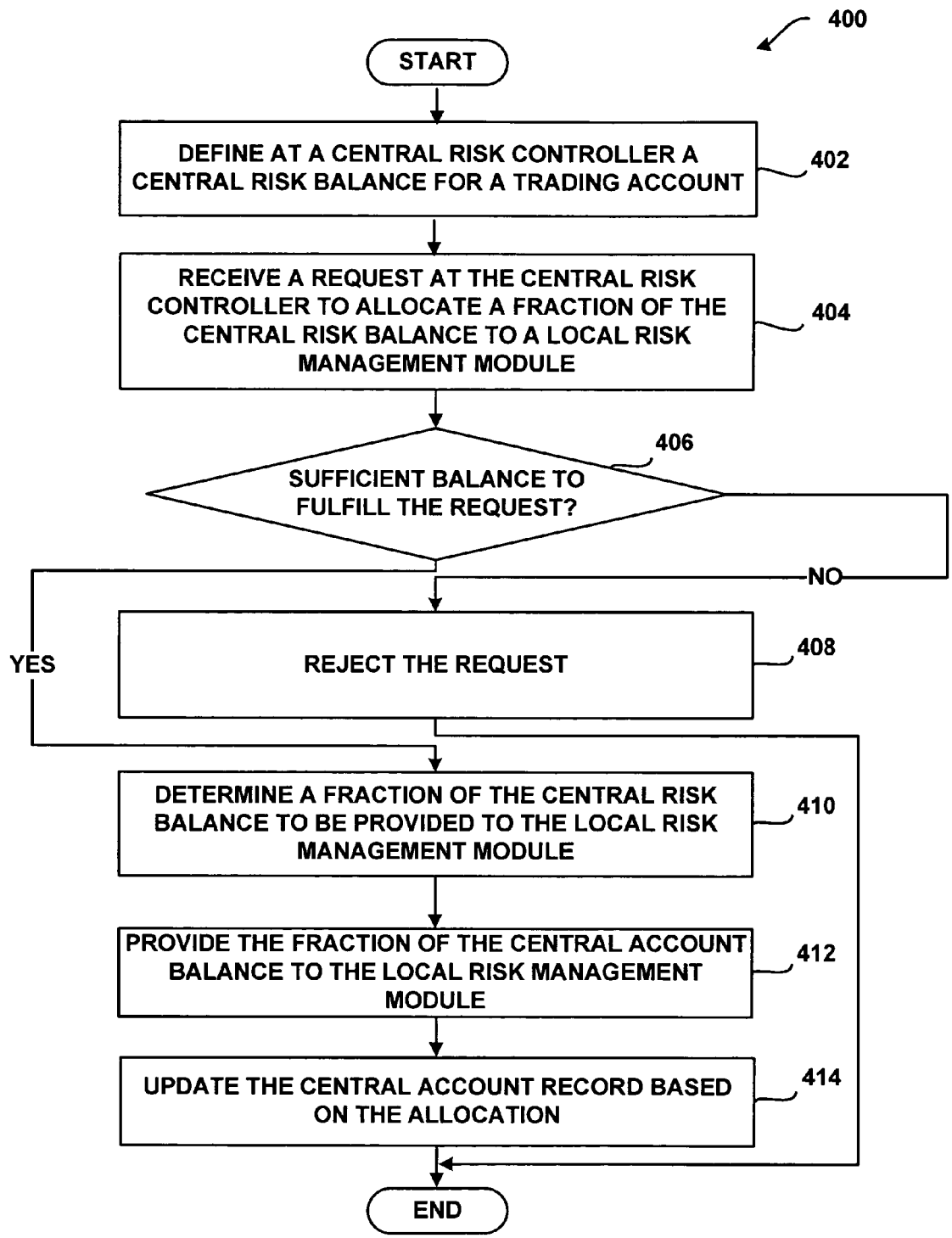
FIG. 4 illustrates a flowchart describing one example method for allocating a risk account balance to a local risk management module.

FIG. 4 is a flowchart describing an example method 400 for allocating a risk account balance to a local risk management module. At step 402, the central risk controller 306 receives a central risk balance data corresponding to a trading account created for a trading entity. According to one example embodiment, the central risk balance and the corresponding trading account may be defined by a system administrator or could be communicated to the central risk controller 306 from another entity. As mentioned earlier, the trading account could be used to control trades initiated from one or more electronic trading stations and/or different automatic trading tools that automatically generate orders to be sent to an electronic exchange. The trading account could be identified by a trading identifier. While the example embodiments described herein use a monetary balance as means for risk management, it should be understood that the example embodiments are not limited to the use of monetary balances. For example, non-monetary metrics could be used as well as means by which the example systems can measure and control risk. For example, the risk could be controlled and measured based on any other trading related parameters, such as a total net position that a trader/trading entity is allowed to hold at any given time, a working order quantity, or a number of tradeable objects that can be traded at any given time. Also, statistical risk measures, such as volatility, the number of traders logged in, or yet some other parameters, could be used as well.

At step 404, the central risk controller 306 receives a request to allocate to a local risk management module, such as 324, a fraction of the central risk balance corresponding to the defined trading account. According to one example embodiment, the request could be communicated from the local risk management module, such as when a first order request is received at a gateway associated with the local risk management module from one of the trading entities that use the central trading account. Alternatively, the request could be communicated from the trading entity itself upon detecting a trader or some other automated trading tool initiating trading. Alternatively, the request could be generated internally at the central risk controller 306 upon detecting one or more preset conditions. The conditions that can be used to trigger the allocation may be based on the trading history, predefined current events, or the combination thereof. For example, upon allocating a risk account balance to one local risk management module corresponding to the first gateway, the central risk controller 306 could use a trading history record corresponding to the trading entity to determine that there is a likelihood of trades being sent through a second gateway corresponding to a different localized risk management module. In such an embodiment, the allocation request for the different localized risk management module could be triggered upon detecting that a trader is trading at the first gateway. The conditions could be preprogrammed.

At step 406, the central risk controller 306 determines if there is a central account balance to fulfill the request. To do that, the central risk controller 306 may use the account identifier provided in the request to determine if there is any central account balance corresponding to the trading entity. If there has been no central account balance created for the trading entity, or the balance has been completely used, at step 408, the central risk controller 306 may reject the request by sending a rejection request message to the local risk management module. According to an alternative embodiment, even if there is no central account balance, the central risk controller 306 could shift at least a portion of the available balance from one local risk management module to the requesting module, the methods of which will be described in relation to one of the subsequent figures.

If there is sufficient central account balance available, at step 410, the central risk controller 306 determines a fraction of the balance corresponding to the central account to be provided to the local risk management module. According to one example embodiment, the central risk controller 312 could allocate the requested portion of the central risk account balance to the local risk management module. Alternatively, the central risk controller 312 could provide a smaller balance than the requested one. According to one example embodiment, the central risk controller 312 could be programmed with a number of balance allocation rules to be used for dynamically allocating the account balance between the local risk management modules. The rules could be preprogrammed or could be based on a trading history, such as for example, the number of trades being sent through a gateway corresponding to the local. risk management module, or the traded quantity corresponding to orders being sent via the gateway as compared to other gateways that a trader uses or may use during a trading day. Different account allocation criteria could be used as well.

At step 412, the central risk controller 312 provides the allocated risk account balance to the requesting local risk management module. According to one example embodiment, the central risk controller 312 may send a risk data allocation message to the local risk management module, and the message could include risk data to be managed at the local risk management module. At step 414, the central risk controller 312 updates the central account records so that the records reflect the allocation of the central risk balance to the local risk management module. More specifically, the available balance corresponding to the central account is decreased by the allocated balance, and a record for the local risk management module is either created or updated with the newly allocated balance. As described above, many different risk parameters could be used, and a separate risk balance could be created and managed for each parameter. For example, one account balance could be created and managed for a net position, while another account could be associated with the monetary credit still available for trading.

Figure 5:
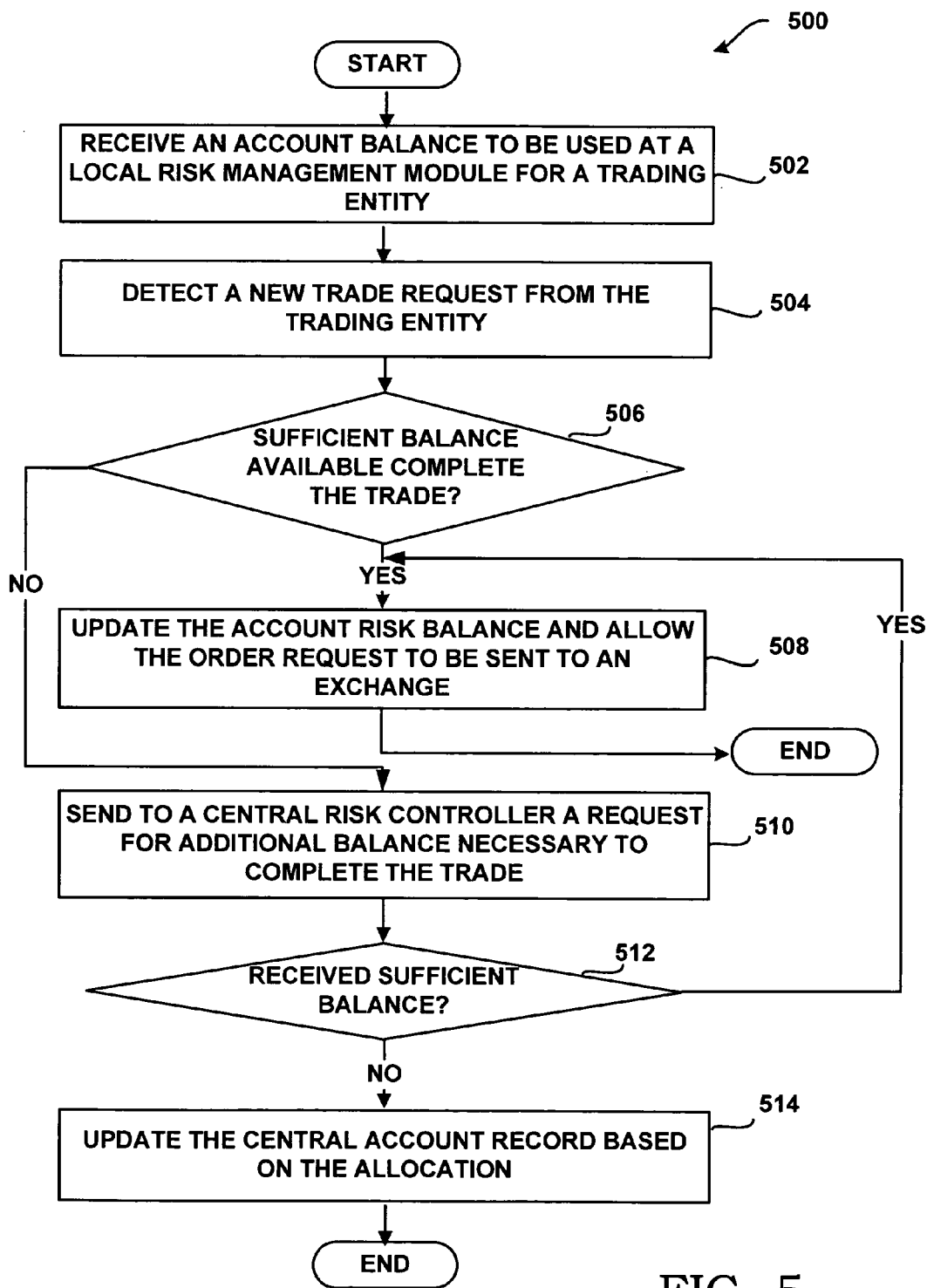
FIG. 5 illustrates a flowchart describing one example method for using and managing a risk account balance at a local risk management module.

FIG. 5 is a flowchart describing an example method 500 for using and managing a risk account balance at a local risk management module. At step 502, a local risk management module receives an account risk balance to be used in relation to making risk determination for trades that are initiated at a trading entity. The local risk management module may create or update an account record corresponding to the trading entity to reflect the current available risk account balance. At step 504, the local risk management module detects a new trade request from the trading entity. According to the embodiment, the request could be communicated from another component at a gateway that receives order requests from the trading entity.

At step 506, the local risk management module determines if there is a sufficient local account risk balance to complete the requested trade order. For example, when a monetary risk account balance is used, the local risk management module may subtract the account balance required to complete the trade from the total account balance to see if there would be any account balance remaining after completing the trade. As mentioned earlier, different risk related parameters, other than monetary credits, could be used as well in relation to the risk accounts being kept at the local risk management module and the central risk management module. Also, more than one risk related parameter could be monitored at any given time before sending an order to an electronic exchange.

If there is a sufficient balance at the local risk account, at step 508, the local risk management module updates the risk balance of its local account and allows the order request to be sent to the electronic exchange. However, if the local account balance is not sufficient, at step 510, the local risk management module may send to a central risk controller 306 a request for an additional account balance. According to one example embodiment, the additional balance requested by the local risk management module may be equal to the balance necessary to allow the order request to be sent to the electronic exchange. Alternatively, a higher balance could be requested as well.

At step 512, the local risk management module determines if a sufficient risk account balance necessary to complete the order request was received from the central risk controller. If so, the method 500 continues at step 508, and the trade order request is sent to the electronic exchange. However, if the local risk management module does not receive any additional balance or the received balance is still not sufficient for the trade order to be sent to the electronic exchange, the local risk management module rejects the trade order request, as shown at 514. According to one example embodiment, a gateway corresponding to the local risk management module may responsively send an order request rejection message to a trading station that initiated the order.

According to another embodiment that was mentioned earlier, rather than using the central account balance to allocate additional balance to one or more local management modules, the central risk controller could shift the funds from a local management module that has a big risk account balance left to the one that needs an additional balance. An example method 600 for shifting an account balance between two local risk management modules will be described in relation to a flowchart illustrated in FIG. 6.

Figure 6:
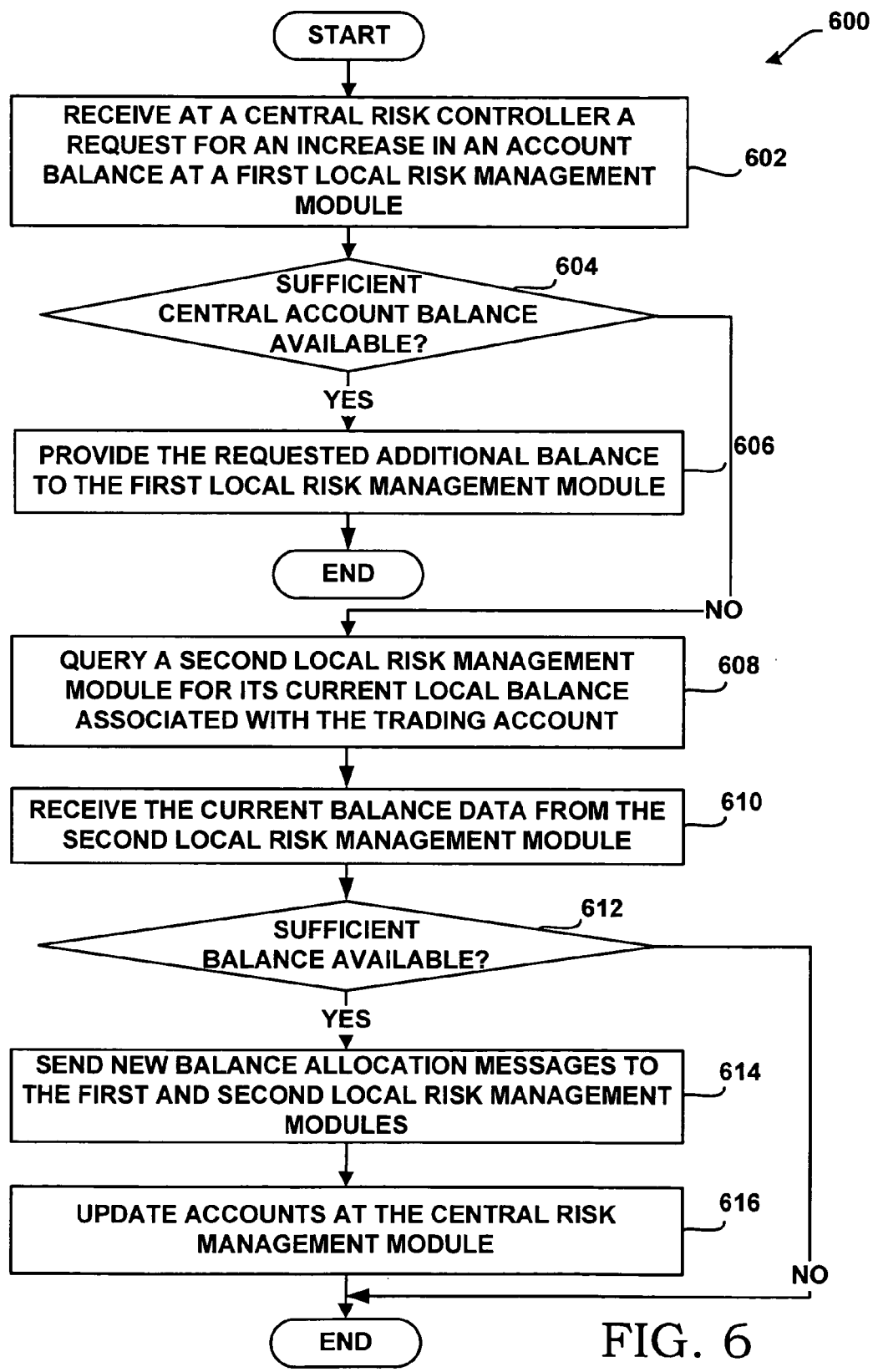
FIG. 6 illustrates a flowchart describing one example method for shifting an account balance between two local risk management modules.

Referring to FIG. 6, at step 602, the central risk controller receives a request from a first local risk management module for an increase of a local risk account's balance associated with a trading account. At step 604, the central risk controller determines if there is a sufficient account balance left in the central risk account to fulfill the request. If the account balance is sufficient, at step 606, the central risk controller may provide the requested balance or a higher additional balance to the first local risk management module. As mentioned earlier, the central risk management module may be configured with a set of risk allocation rules that may control allocation of the additional funds to the local risk management modules.

Referring back to step 604, if the balance in the central risk account is not sufficient, at step 608, the central risk controller may query a second local risk management module for the current local account balance associated with the trading account. At step 610, the central risk controller receives the current account balance information from the second local risk management module. At step 612, the central risk controller determines if there is sufficient local account balance available at the second local risk management module to allocate a portion of that balance to the first local risk management module. It should be understood that this determination could be based on a number of rules, such as a minimum account balance to be held at the local risk management module, time of day, trading activity corresponding to a gateway that uses a local risk management module, and many others.

As shown at 612, if the account balance at the second local risk management module is not sufficient to shift it to the first local management module, the method terminates. If there is sufficient account balance, at step 614, the central risk controller may send new balance allocation messages to both the first and second local risk management modules. According to the example given in relation to the method 600, the message to the first local management module would include a balance increase request, and the message to the second local management module would include a balance decrease request. At step 616, the central risk controller may update its account records corresponding to the first and second local risk management module to reflect the current balance allocation.

It should be understood that different changes could be made with respect to the method 600. For example, some method steps could be omitted. According to one alternative embodiment, the central risk controller could monitor the orders being made from the trading stations and could automatically update the records corresponding to different local risk management modules based on the trades that were managed by each module. In such an embodiment, the steps of 608 and 610 of querying the local management modules for their current account balances and receiving the local account information at the central risk controller could be omitted since the central risk management module would at least have an approximate account balance for each or at least some modules. Also, while the method 600 was described in relation to a single local management module being queried by the central risk controller, the steps of the method 600 could be repeated in relation to other local management modules that could be used to manage and control risk account balance corresponding to the same trading account.

Figure 7A:
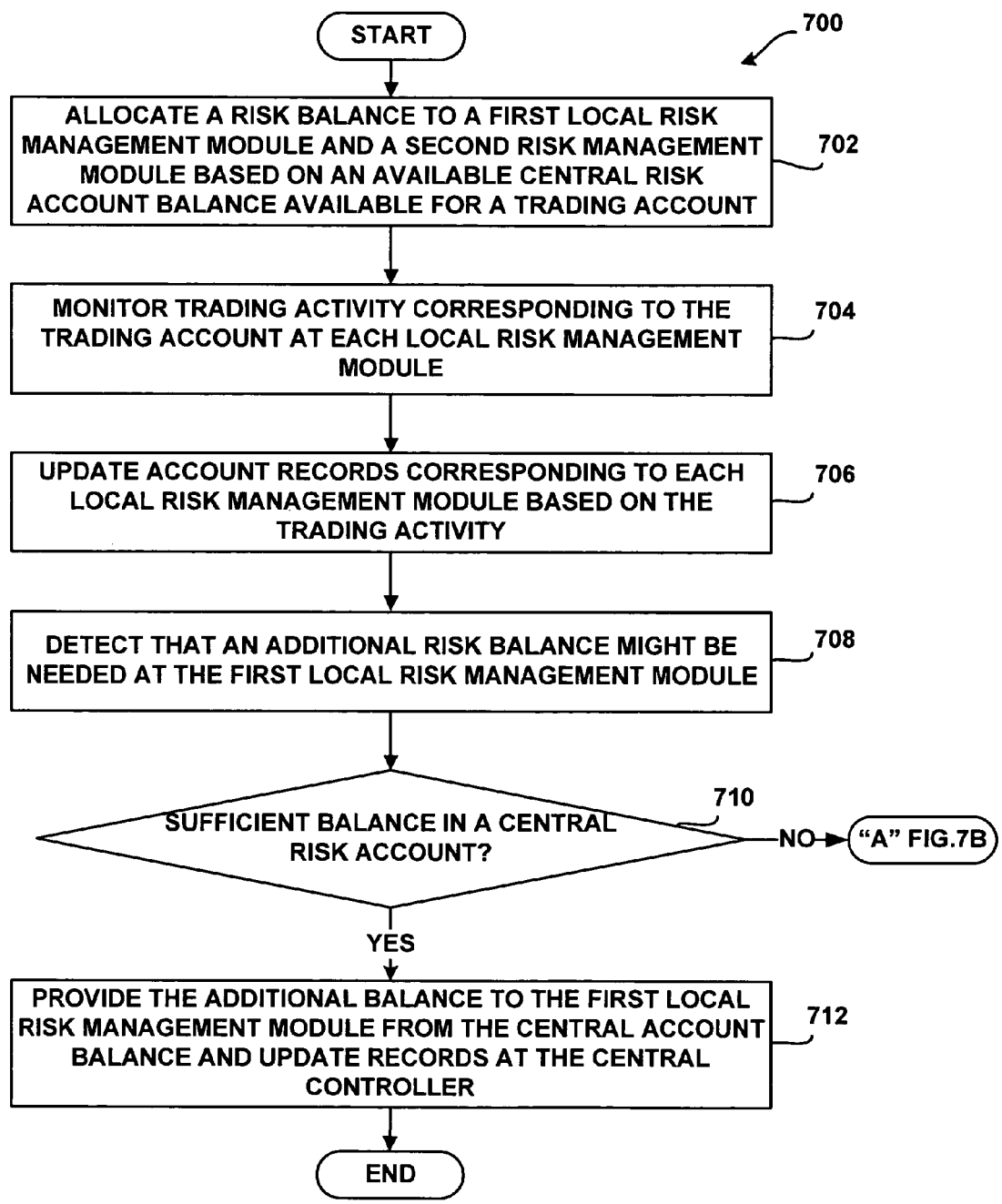
FIGS. 7A and 7B illustrate a flowchart that illustrates an example method for automatically monitoring and allocating an additional account balance at a local risk management module.
Figure 7B:
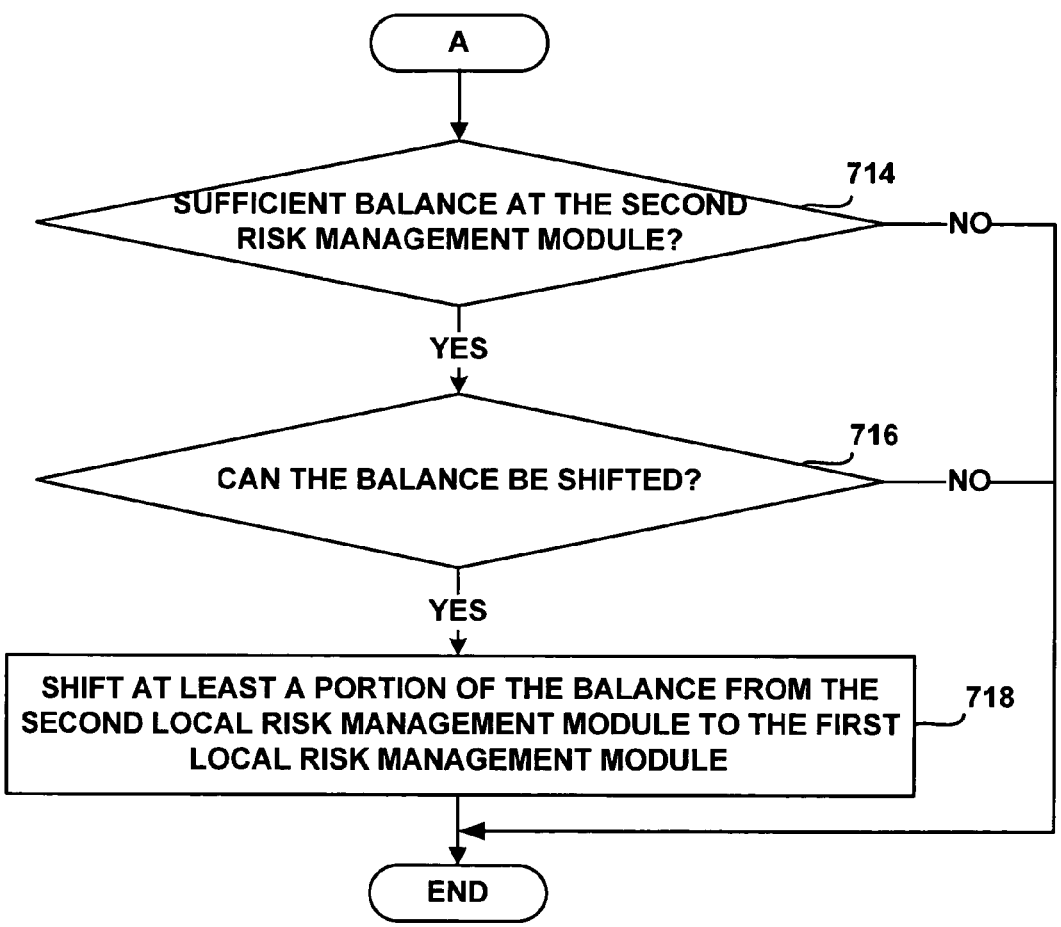

FIGS. 7A and 7B illustrate a flowchart that illustrates an example method 700 for automatically monitoring and allocating an additional account balance at a local risk management module.

At step 702, a central risk controller allocates a risk balance to a first local risk management module and a second local risk management module based on a central risk account balance available for a trading account. As mentioned earlier, many different account balance allocation rules could be used. Also, the trading account could be used by many different trading entities.

At step 704, the central risk controller monitors trading activity at each local risk management module. To do that, the central risk controller could monitor orders being sent from trading entities associated with a trading account via gateways associated with each local management module. According to one example embodiment, the central risk management controller could receive order information from the trading entities. Such information could be either provided dynamically as the trade orders are being submitted, or periodically based on some preset time settings that could vary based on time of day, or some other market or trader related events that may be thought of as triggering submission of orders.

At step 706, the central risk controller updates its account records corresponding to each local risk management module based on the trading activity corresponding to the trading account. Additionally, each local risk management module may periodically send to the central risk management module a current risk account balance corresponding to the trading account. At step 708, the central risk controller detects that an additional risk balance might be needed at the first local risk management module. According to an example embodiment, this determination may be based on the local account balance being kept and dynamically updated at the central risk management module, as well as one or more account allocation rules that determine the account balance to be provided to each local risk management module.

At step 710, the central risk controller determines if sufficient balance is left in the central risk account to provide the additional balance to the first local risk management module. If there is sufficient balance, at step 712, the central risk controller provides the additional balance to the first local risk management module. It should be understood that the additional balance allocated to the first local risk management module can be based on balance allocation rules being used at the central risk management module to allocate risk account balance to local risk management modules.

Referring back to step 710, if the central account balance is not sufficient to allocate the additional balance to the first local risk management module, at step 714, the central risk management module determines if there is sufficient account balance at the second risk management module. According to one example embodiment, the • sufficient account balance would be at least the additional account balance needed at the first risk management module. If there is no sufficient account balance, the method 700 terminates. If there is sufficient account balance available, at step 716, the central risk controller determines if at least a portion of the balance at the second local risk management module can be shifted to the first local risk management module. Such determination may be based on many different account balance allocation rules. For example, the account balance allocation rules could include a minimum account balance rule, a trading activity record that can be used to determine the account balance that may be needed at each local risk management module, etc.

If the central risk management module determines that at least a portion of the local balance at the second local risk management module cannot be shifted to the first local risk management module, the method 700 terminates. Otherwise, at step 718, the central risk management module shifts at least a portion of the local balance at the second risk management module to the first local management module. The allocation of the balance could be accomplished by sending new allocation messages to the first and second local risk management modules. More specifically, an account balance increase message including a request to increase the account balance level would be sent to the first local risk management module, and an account balance decrease message including data including a request to decrease the account balance level would be sent to the second local risk management module.

Also, while not specifically described above, two local risk management modules could directly communicate with each other to shift account funds corresponding to a trading account. In such an embodiment, upon the allocation of the funds, one of the gateways could communicate with the central risk management module to provide the updated account information for central record keeping purposes at the central module. It should be understood that the central risk management module could control which local risk management modules could directly arrange a balance transfer with another local modules. For example, a number of rules could be programmed that control which local risk management modules could directly communicate at any given time. Also, it should be understood that the limitations could be based on an account with respect to which funds are to be transferred.

It will be apparent to those of ordinary skill in the art that methods involved in the system and method for multi-market risk control may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A non-transitory computer readable medium having stored therein instructions executable by a processor, wherein the instructions are executable to:

establish a first local account balance at a first intermediary device that forwards trade orders to buy or sell a first tradeable object from a first client device to a first matching process at a first electronic exchange, the first local account balance comprising a first portion of a central account balance established for a trading account at a central module, wherein the first portion is of a first type of balance;

establish a second local account balance at a second intermediary device that forwards trade orders to buy or sell a second tradeable object from a second client device to a second matching process at a second electronic exchange, the second local account balance comprising a second portion of the first type of balance at the central account balance established for the trading account, the second portion allocated based on a remaining first type of balance of the central account balance after the first local account balance was allocated from the central account balance, wherein the first intermediary device and the second intermediary device are different intermediary devices;

upon receipt at the first intermediary device of a first trade order associated with the trading account to be sent to the first matching process, determine whether to send the first trade order to the first matching process based on the first local account balance without communicating with the central module associated with the central account balance, wherein the first intermediary device sends the first trade order to the first matching process when the first local account balance is sufficient, and wherein the first intermediary device refrains from sending the first trade order to the first matching process when the first local account balance is not sufficient;

upon receipt at the second intermediary device of a second trade order associated with the trading account to be sent to the second matching process, determine whether to send the second trade order to the second matching process based on the second local account balance without communicating with the central module associated with the central account balance, wherein the second intermediary device sends the second trade order to the second matching process when the second local account balance is sufficient, and wherein the second intermediary device refrains from sending the second trade order to the second matching process when the second local account balance is not sufficient;

upon determination that the first local account balance is not sufficient when the first trade order is received, send a request to the central module associated with the central account balance to allocate an additional account balance to the first local account balance; and upon determination that the second local account balance is not sufficient when the second trade order is received, send a request to the central module associated with the central account balance to allocate an additional account balance to the second local account balance.

2. The computer readable medium of claim 1, wherein the instructions are further executable to:

when the first local account balance is sufficient upon allocation of the additional account balance to send the first trade order, send the first trade order to the first matching process; and when the second local account balance is sufficient upon allocation of the additional account balance to send the second trade order, send the second trade order to the second matching process.

3. The computer readable medium of claim 1, wherein the instructions are further executable to:

update the first local account balance upon sending the first trade order to the first matching process; and update the second local account balance upon sending the second trade order to the second matching process.

4. The computer readable medium of claim 1, wherein when the first local account balance is not sufficient, the instructions are further executable to:

send a request to a local module associated with the second local account balance to allocate an additional account balance to the first local account balance.

5. The computer readable medium of claim 4, wherein the instructions are further executable to:

allocate the additional account balance from the second local account balance to the first local account balance; and when the first account balance is sufficient upon allocation of the additional account balance from the second local account balance, send the first trade order to the first matching process.

6. The computer readable medium of claim 1, wherein when the second local account balance is not sufficient, the instructions are further executable to:
send a request to a local module associated with the first local account balance to allocate an additional account balance to the second local account balance.

7. The computer readable medium of claim 6, wherein the instructions are further executable to:
allocate the additional account balance from the first local account balance to the second local account balance; and
when the second account balance is sufficient upon allocation of the additional account balance from the first local account balance, send the second trade order to the second matching process.

8. The computer readable medium of claim 1, wherein the first account balance comprises a monetary balance for the trading account.

9. The computer readable medium of claim 1, wherein the second account balance comprises a monetary balance for the trading account.

10. The computer readable medium of claim 1, wherein the first account balance comprises a non-monetary balance for the trading account.

11. The computer readable medium of claim 10, wherein the non-monetary balance is based on a risk parameter associated with trading activity of at least one trader using the trading account.

12. The computer readable medium of claim 10, wherein the non-monetary balance is based on a statistical risk parameter.

13. The computer readable medium of claim 1, wherein the first matching process and the second matching process are located at different electronic exchanges.

14. The computer readable medium of claim 1, wherein the first electronic exchange and the second electronic exchange are the same electronic exchange.

15. The computer readable medium of claim 1, wherein the first electronic exchange and the second electronic exchange are different electronic exchanges.

16. The computer readable medium of claim 1, wherein the first intermediary device is a gateway.

17. The computer readable medium of claim 1, wherein the second intermediary device is a gateway.

18. The computer readable medium of claim 1, wherein the first client device and the second client device are the same client device.

19. The computer readable medium of claim 1, wherein the first client device and the second client device are different client devices.

* * * * *